United States Patent [19]

Sprenger

[11] Patent Number: 4,561,689
[45] Date of Patent: Dec. 31, 1985

[54] DEVICE FOR SECURING A MOTOR VEHICLE WINDOW PANE

[75] Inventor: Willi Sprenger, Wallrabenstein, Fed. Rep. of Germany

[73] Assignee: General Motors Corporation, Detroit, Mich.

[21] Appl. No.: 547,023

[22] Filed: Oct. 31, 1983

[30] Foreign Application Priority Data

Nov. 22, 1982 [DE] Fed. Rep. of Germany ....... 3243101

[51] Int. Cl.$^4$ ................................................. B60J 1/02
[52] U.S. Cl. ..................................... 296/84 A; 29/240; 29/270
[58] Field of Search ............ 296/84 A, 84 D; 29/240, 29/270; 81/90 C

[56] References Cited

U.S. PATENT DOCUMENTS

| | | | |
|---|---|---|---|
| 2,242,363 | 5/1941 | Michon | 29/240 |
| 3,122,048 | 2/1964 | Warner | 29/240 X |
| 3,760,659 | 9/1973 | Campbell | 81/90 C |
| 4,309,123 | 1/1982 | Moore | 29/240 X |

FOREIGN PATENT DOCUMENTS

| | | |
|---|---|---|
| 7632193 | 2/1977 | Fed. Rep. of Germany . |
| 2219189 | 6/1979 | Fed. Rep. of Germany . |
| 2723255 | 7/1979 | Fed. Rep. of Germany . |
| 3008557 | 9/1981 | Fed. Rep. of Germany . |
| 3008551 | 10/1981 | Fed. Rep. of Germany . |

Primary Examiner—Frederick R. Schmidt
Assistant Examiner—Steven P. Schad
Attorney, Agent, or Firm—Charles E. Leahy

[57] ABSTRACT

For the purpose of mounting a motor vehicle window, especially a windshield or rear window, into the body opening provided therefor, rotatable and fixable eccentric members attached to a body panel are being employed. The eccentric members are inserted into apertures provided in the body panel by means of their cylindrical portions and are adapted, when being turned, to move the windshield, after insertion of the same into the flange portions, upwardly into its final position. The turning of the eccentric members is accomplished by a special tool which may be provided with means for adjusting the torque. The windshield is fixed in this position by pins forced through the cylindrical portions of the eccentric members.

2 Claims, 6 Drawing Figures

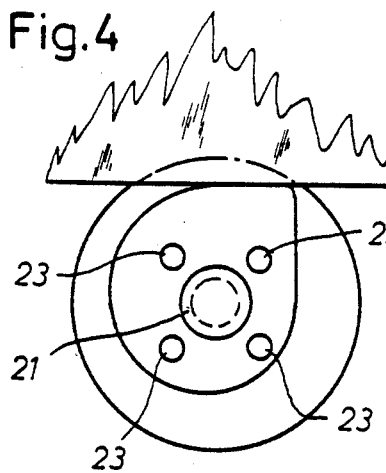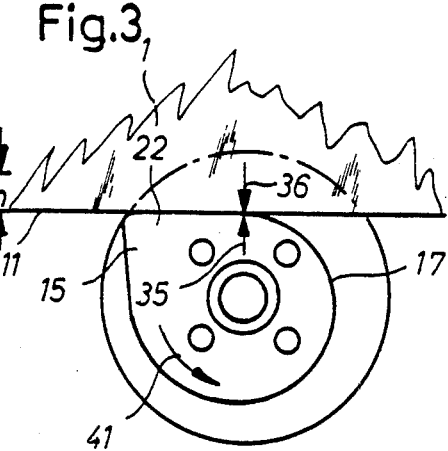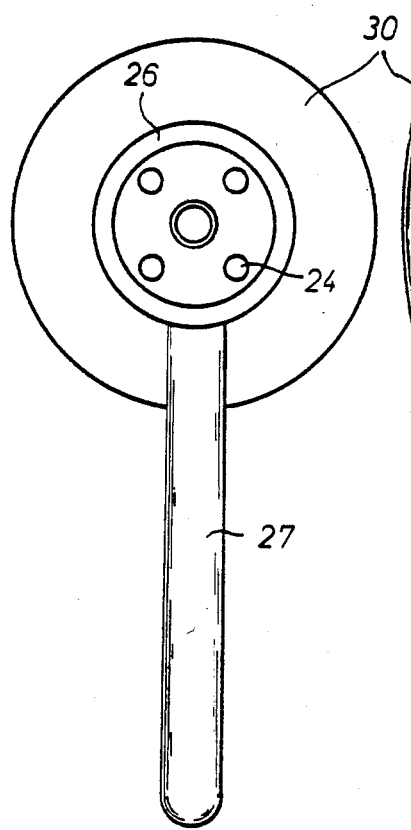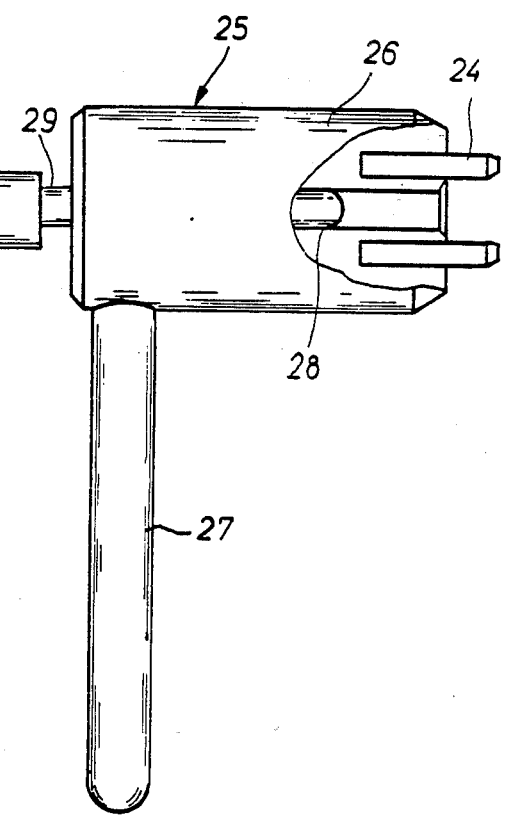

DEVICE FOR SECURING A MOTOR VEHICLE WINDOW PANE

The invention relates to a device for mounting a window in a vehicle and more particularly a mounting device which enables adjustment of the window in the window opening.

BACKGROUND OF THE INVENTION

The invention relates to a device for mounting a motor vehicle window, especially a windshield or rear window, into a frame comprised of the frame side portions disposed on either side of the window, an upper frame portion and a flange portion for retaining the window, said window being in engagement with the flange portion through an elastic sealing strip, the associated edge of the window being embraced from all sides by at least two flange portions, and the window panel fitted within the flange portions being fixed into position by retaining elements acting upon the lower edge of window panel.

A mounting arrangement of this type for use with motor vehicle windows has been disclosed in German Pat. DE-PS No. 27 23 255. According to this patent, a window having a sealing strip secured to its edge is inserted by making use of its conical configuration into the flange portion engaging the window's peripheral edge such that it is positioned a predetermined distance below its final position, said flange portion being formed of side portions which are also of conical configuration and of an upper portion. The window is subsequently urged upwardly into its final position and then fastened by means of a lower flange portion. The lower window flange is detachably connected to the associated body panel and is adapted, after removal of the fastening means or prior to the tightening thereof, to be moved in the direction of the plane of the window. However, the lower window flange is not a suitable means for adjusting the window together with the sealing strip attached thereto inside the flange portions of the window frame, and it is therefore relatively difficult to compensate for dimensional tolerances that may be encountered.

SUMMARY OF THE INVENTION

It is the object of the present invention to provide an improved and simplified mounting arrangement for motor vehicle windows and to facilitate adjustment of the window during installation. This object is being achieved in accordance with the present invention in that the retaining elements are in the form of rotatable and fixable eccentric members which are secured to a body panel and which are adapted to move the window, after placement of the same into the flange portions, upwardly into its final position.

The use of eccentric members according to the present invention affords accurate and speedy adjustment of the window and permits tolerance compensation in a relatively simple manner. Furthermore, it enables to determine the required torque and to adjust the tool for turning the eccentric member accordingly. Thus, the installation of the window according to the present invention requires less time and is particularly suitable for economical mass production.

In a further advantageous development, the eccentric member is provided with a cylindrical portion which permits easy anchoring of the eccentric member into the apertures of the body panel provided for this purpose. A pin adapted to be forced into the cylindrical portion enables the eccentric member to be fastened without much effort so that the window can be fixed and retained in the desired position. The eccentric member and the window are provided with respective markings which serve to facilitate accurate placement of the window into the frame.

BRIEF DESCRIPTION OF THE DRAWINGS

Other details and advantages will become apparent from the sub-claims and the descriptions, as well as the accompanying drawings, in which one exemplary embodiment of the invention is illustrated.

In the drawings:

FIG. 3 is a front view of the eccentric member, illustrating its initial position, i.e., the position at the time the window is inserted into the frame;

FIG. 4 is the eccentric member according to FIG. 3 in its final position;

FIG. 5 is a side view of the tool for turning the eccentric member;

FIG. 6 is a top view of the tool according to FIG. 5.

DESCRIPTION OF THE PREFERRED EMBODIMENT

Figure 1:
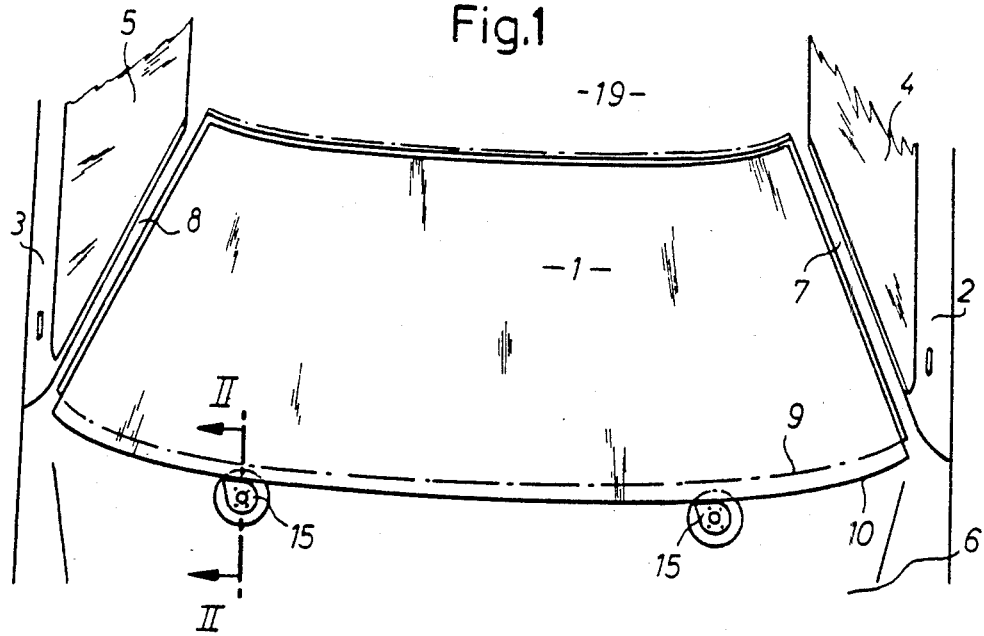
FIG. 1 is a front portion of a passenger car and a top view of the windshield.
Figure 2:
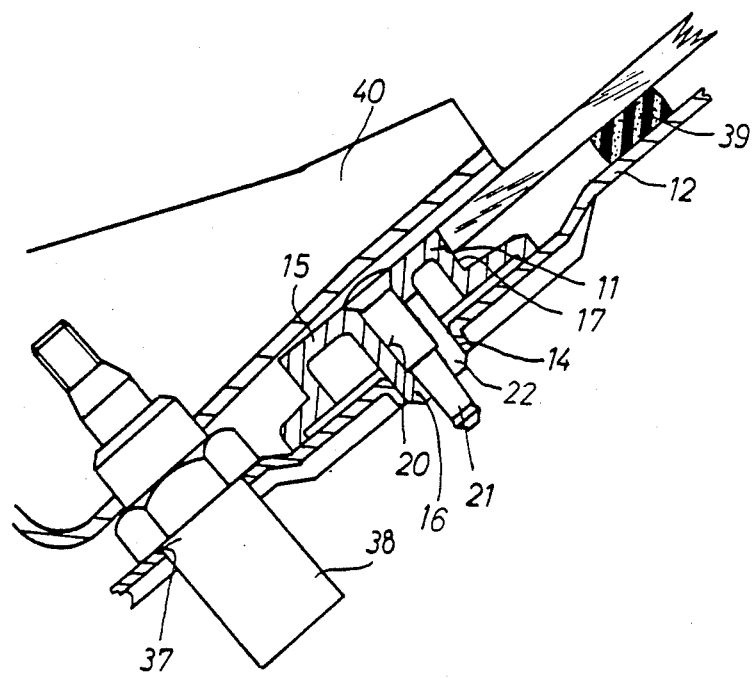
FIG. 2 is a sectional view along line II—II of FIG. 1.

In FIG. 1, the windshield is designated by the numeral 1, the doors by the numerals 2 and 3, the side windows by the numerals 4 and 5, and the hood by the numeral 6. The side frames or pillars 7 and 8 of the car form one portion of the windshield frame. The dash-dotted line 9 in FIG. 1 indicates the final position, while the solid line 10 illustrates the windshield in its initial position prior to the mounting procedure.

At the lower edge 11 of the windshield 1, the body panel 12 is provided, for example, with two cylindrical flanged apertures 14, each of which is adapted to receive one eccentric member 15 which is being clamped in engagement therein by way of its hollow cylindrical portion or extension 16 having a bore 20 therethrough and an expansion slot 22. The lower edge 11 of the windshield is engaging the lateral surfaces of the eccentric member 17. The support flanges for the windshield 1 are formed by the flanged edges of the pillars 7 and 8 of the windshield frame and the upper frame portion 19. The eccentric member 15 is provided with a bore 20, with a pin 21 being forced therethrough for retaining the eccentric member 15 in its final position as will be described hereinafter. As is apparent from FIG. 3, the eccentric member 15 is in the form of a cam which serves to lift the windshield into its final position. The eccentric member is provided with four recesses 23 for receiving the pins 24 of the special tool 25 illustrated in FIGS. 5 and 6. The tool 25 is comprised of a rotary body 26 including a handle 27 and the four pins 24 for insertion into the recesses 23 of the eccentric member 15. Furthermore, if desired, the rotary body 26 may be provided with a torque limiting means, not shown, for adjusting the torque that is to be transmitted to the eccentric member 15. The rotary body 26 also has an axial bore 28 for rotatably receiving a shaft 29. A knob 30 is attached to one end of the shaft 29 and serves as a means for holding the rotary member 26 in position while the rotary body 26 is rotated via the handle 27 for turning the eccentric member 15 by the four pins 24 which extend into the four recesses 23. For the purpose of aligning the windshield 1 during the installation procedure, markings 35 and 36 are provided on the eccentric member 15 and the windshield 1, respectively. A windshield wiper motor 38 is mounted into an opening 37 provided in panel 12. The windshield 1 is fastened to the body panel 12 by means of an adhesive material 39, and a panel 40 serves to conceal the lower edge of the windshield.

The installation proceeds in that the windshield 1 is placed into the supporting flanges, the eccentric members 15 are inserted into the apertures 14 of the panel 12 so as to assume the position illustrated in FIG. 3, and the marking 35 on the eccentric member 15 is put into alignment with the marking 36 on the lower edge of the window. Thereafter, the eccentric member 15 is turned by means of the special tool 25 in the direction of arrow 41 until it assumes the position according to FIG. 4. This will cause the lower edge 11 of the window to be lifted and the windshield 1, together with the sealing strip attached thereto, to be urged into the supporting flanges of the frame. The height between the initial position of the lower window edge 11 in FIG. 3 and the final position in FIG. 4 is indicated by the letter h. When the eccentric member 15 has assumed the position according to FIG. 4, the windshield 1 will be in its final position. In order to fix the windshield 1 in this final position, a pin 21 is forced through the bore 20 to thereby spread apart the hollow cylindrical portion or extension 16 as permitted by the slot 22 thereof so that the eccentric member 15 will be firmly secured in the flanged apertures 14 of the body panel 12.

The invention has been described in the foregoing in conjunction with the accompanying drawings, but is not limited in scope to the illustrated embodiment. Instead, a great many alternate embodiments are conceivable in which the individual components of the window mounting may vary in terms of configuration or arrangement without departing from the overall concept of the invention.

The embodiments of the invention in which an exclusive property or privilege is claimed are defined as follows:

1. Device for adjusting the mounting position of a vehicle window in a frame comprised of two side frame portions and upper frame portion and a sheet metal body panel portion at the lower edge of the window, comprising:

a cylindrical flanged aperture in the body panel below the lower edge of the window;

an eccentric member having an outer periphery in the form of a cam adapted to support the lower edge of the glass and serve to lift the window upon rotary movement of the eccentric member, said eccentric member having a hollow cylindrical portion extending into the cylindrical flanged aperture of the body panel to mount the eccentric member for rotation of the cam to effect said lifting of the window, said hollow cylindrical portion having a bore therethrough; and a pin adapted to be forced through the bore of the cylindrical hollow portion of the eccentric member to spread the hollow cylindrical portion apart and thereby firmly secure the hollow cylindrical portion of the eccentric member in a fixed rotary position in the cylindrical flanged aperture to retain the window at the adjusted position obtained by rotation of the eccentric member.

2. The device according to claim 1 further characterized by the hollow cylindrical portion having a slot therein facilitating the spreading apart of the hollow cylindrical portion.

* * * * *